UNITED STATES PATENT OFFICE.

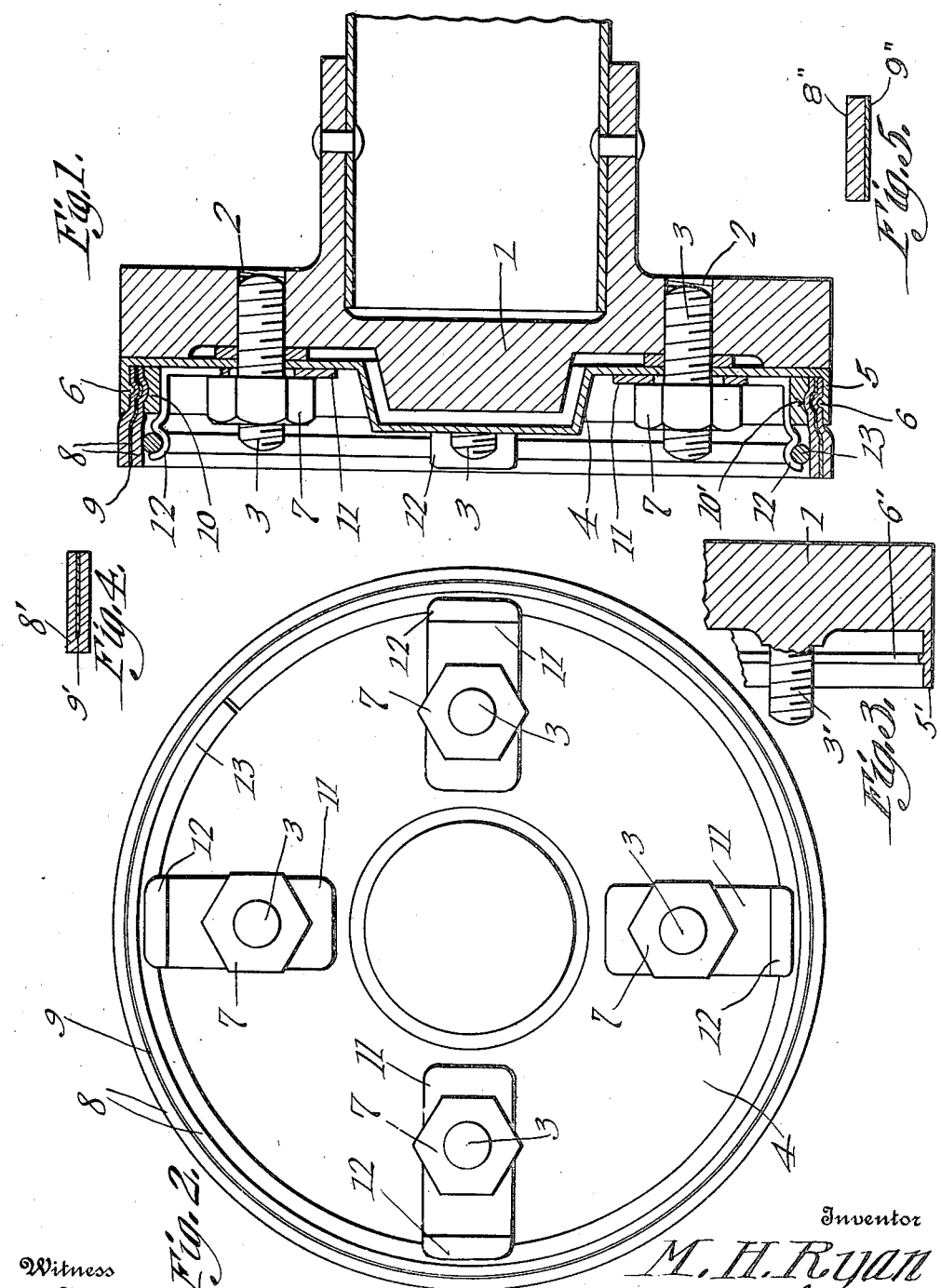

MICHAEL H. RYAN, OF SAN BERNARDINO, CALIFORNIA.

PISTON.

1,324,272.   Specification of Letters Patent.   Patented Dec. 9, 1919.

Application filed November 4, 1918. Serial No. 261,126.

*To all whom it may concern:*

Be it known that I, MICHAEL H. RYAN, a citizen of the United States, residing at San Bernardino, in the county of San Bernardino and State of California, have invented a new and useful Piston, of which the following is a specification.

The subject of this invention is a piston and gasket therefor such as is intended for use in the cylinder of an air brake though capable of use where cylinders and pistons of like character are employed.

A main object of the invention is the provision of a piston which is thoroughly air tight and will not leak.

Another object of the invention is the provision of a gasket or packing ring for the piston.

Another object of the invention is the provision of means for locking the packing ring in place on the piston.

Another object of the invention is the provision of means for holding the packing ring in engagement with the cylinder walls.

The invention also contemplates generally improving the construction and enhancing the utility of pistons.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Practical structures for carrying out the invention are shown in the accompanying drawing, wherein:—

Figure 1 is a sectional view of a piston constructed in accordance with the invention;

Fig. 2 is a plan view of the head end of the same;

Fig. 3 is a fragmentary sectional view of a modification;

Fig. 4 is a detail sectional view of another form of packing ring;

Fig. 5 is a similar view of still another form.

Referring to the drawing by numerals of reference:—

An ordinary form of piston used in air brake cylinders is indicated by the numeral 1, and this piston is tapped, as at 2, to receive the annularly spaced screw bolts 3. A circular plate 4, formed with an annular peripheral flange 5 on the inner face of which flange is formed a longitudinally extending rib 6, is apertured to receive the screw bolts 3, on which bolts nuts 7 are threaded to bind the plate in place upon the piston.

A gasket or packing ring is provided, which is formed of two rings 8 of leather or other like material, and between these rings is inserted a ring of thin metal, indicated by the numeral 9. This thin metal ring tends to stiffen and back up the leather rings and aid them in holding their proper form. The gasket or ring thus formed rests against the inner face of the flange 5 and extends beyond the edge of such flange.

For the purpose of retaining the packing ring in place, a metal ring 10 is provided, which is formed with a longitudinal groove 10' for the reception of the rib 6. This ring engages the inner face of the packing ring and clamps the same against the flange 5, the rib 6 and groove 10' serving to lock the ring firmly in place.

The ring 10 is held in position against the inner face of the packing ring not only by its own resiliency but by means of retainers or arms 11, which are slotted longitudinally to receive the bolts 3 and which are clamped in adjusted positions by the nuts 7. The arms 11 have angled ends formed with curved portions 12 which are adapted to clamp a ring 13 in place against the inner face of the extending portion of the packing ring for the purpose of retaining the packing ring in contact with the walls of the cylinder.

In the modified form shown in Fig. 3, the piston is cast with integral threaded bolts or pins 3', and with the integral peripheral flange 5' having a rib 6'. In this form of the device the ring is clamped in place as heretofore described.

In the modified form of packing ring shown in Fig. 4, the ring 8', of leather or the like, is split to receive the metal ring 9', while in the modification shown in Fig. 5 a metal ring 9" forms a backing for the leather ring 8".

It is thought that the operation of the device will be amply apparent from the foregoing description without a special and extended explanation thereof.

Having described the invention, what is claimed as new is:—

1. A piston formed with an annular peripheral flange thereon, a rib extending longitudinally of the inner face of the flange, a ring within the flange and having a groove registering with the rib, a flexible packing ring clamped between the ring and flange and extending beyond the edge of the flange, and means for clamping the ring against the packing ring.

2. A piston formed with an annular peripheral flange thereon, a rib extending longitudinally of the inner face of the flange, a ring within the flange and having a groove registering with the rib, a flexible packing ring comprising a leather ring and a metal ring reinforcing the leather ring clamped between the first mentioned ring and the flange and extending beyond the edge of the flange, and means for clamping the first mentioned ring against the packing ring.

3. A piston formed with an annular peripheral flange thereon, a rib extending longitudinally of the inner face of the flange, a ring within the flange and having a groove registering with the rib, a packing ring held between the ring and the flange, and means for clamping the ring against the packing ring, and means including the clamping means for expanding the packing ring against the walls of a cylinder.

4. A piston, an annular peripheral flange for the piston, a rib extending longitudinally of the inner face of the flange, a clamping ring having a groove registering with the rib, a packing ring held between the ring and the flange and extending beyond the edge of the flange, a ring engaging the inner face of the extending portion of the packing ring, and means for clamping the first mentioned ring against the packing ring and holding the last mentioned ring against the extending portion of the packing ring.

In testimony that I claim the foregoing as my own, I have hereto affixed my signature in the presence of two witnesses.

MICHAEL H. RYAN.

Witnesses:
   ALFRED S. METTLER,
   JAMES F. RUSH.